(No Model.)

E. S. COLT.
DUST PAN.

No. 380,551. Patented Apr. 3, 1888.

Witnesses:
L. G. Conner Jr.
R. B. Seward.

Inventor:
Emma S. Colt,
By James G. Young and
E. B. Seward,
Atty's.

UNITED STATES PATENT OFFICE.

EMMA S. COLT, OF KANSAS CITY, MISSOURI.

DUST-PAN.

SPECIFICATION forming part of Letters Patent No. 380,551, dated April 3, 1888.

Application filed December 1, 1887. Serial No. 256,690. (No model.)

*To all whom it may concern:*

Be it known that I, EMMA S. COLT, a citizen of the United States, residing at Kansas City, in the county of Jackson and State of Missouri, have invented certain new and useful Improvements in Dust-Pans; and I do hereby declare the following to be a full, clear, and exact description of the invention, such as will enable others skilled in the art to which it appertains to make and use the same.

My invention relates to an improvement in dust-pans.

The object is to provide a dust-pan which shall be capable of a ready and convenient adjustment to the desired inclination by the foot of the sweeper, and which may be firmly held in position to resist the pressure of the broom in forcing the dust onto it by the downward pressure of the foot.

A further object is to provide a dust-pan which will retain the dust when the pan is in an inclined position, and in which the devices for tilting and holding the pan in position shall be simple and durable, and the pan as a whole quite inexpensive.

With these ends in view my invention consists in certain features of construction and combinations of parts, as will be hereinafter described, and pointed out in the claims.

Figure 1:
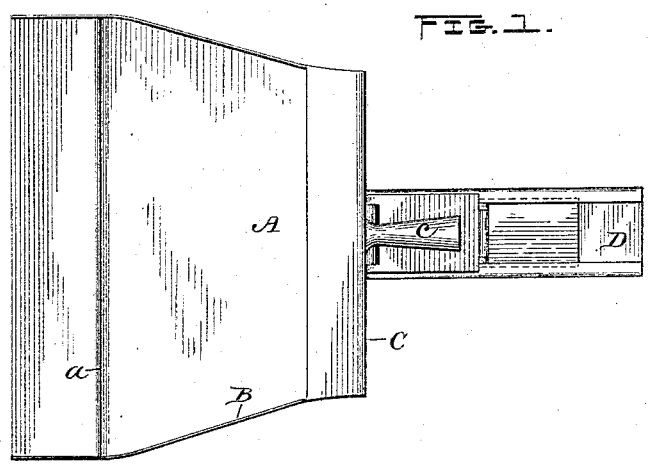
Figure 2:
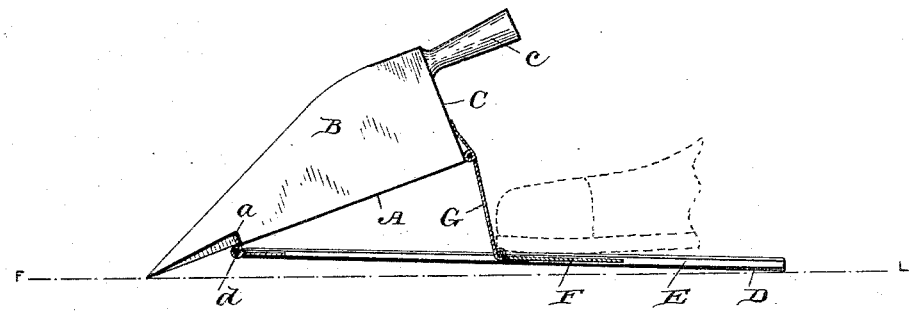
Figure 3:
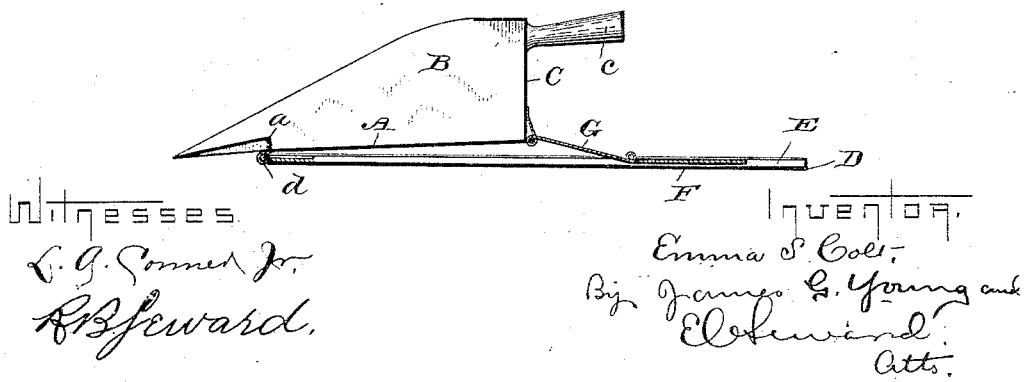

In the accompanying drawings, Figure 1 is a plan view. Fig. 2 is a view in vertical longitudinal section, showing the pan tilted to receive dust; and Fig. 3 is a similar view, showing the pan resting in horizontal adjustment.

A represents the bottom of the pan, B its sides, and C the back. The sides and back may be of any form, such as in ordinary use, the shape herein shown being that which is found convenient for general use.

The bottom A is provided with a transverse shoulder, *a*, a short distance back from the edge of the pan, the said shoulder being conveniently formed by depressing the portion of the bottom rearwardly of the shoulder below the portion in front of the same. The shoulder *a* forms a ledge to catch the dust as it is swept onto the pan, and prevents it from sliding off when the pan is tilted.

The back C is provided with a rearwardly-extending handle, *c*, as is usual.

Hinged to the under side of the bottom A, at the shoulder or ledge *a*, is a flat strip, D, of metal or other suitable material, which extends rearwardly beneath the bottom, and projects several inches beyond the back of the pan. The strip D is intended to lie flat on the floor, and the hinge-joint *d*, between the strip and the bottom, permits the pan to be tilted forwardly and backwardly to give it a greater or less inclination. The strip D is provided with a groove or grooves, E, on its upper face, preferably formed by turning its edges upwardly and over toward each other. A slide, F, is located in the groove E, and is capable of a free sliding movement therein.

A link or standard, G, is hinged at one end to the rear edge of the pan, and at its opposite end to the slide, so that as the slide F is moved toward or away from the pan the rear edge of the pan will be raised or lowered, and the friction of the under face of the slide F with the face of the groove E is such that the pressure of the pan thereon, through the link or standard G, will prevent the slide from moving unless forced by the foot or other pressure. Thus to use the pan it may be slid along the floor by a push from the foot, and when in position may be tilted by lifting up the handle with the toe, the slide and standard retaining it in tilted adjustment. Furthermore, the pressure of the toe of the foot on the strip D at the rear of the standard G will serve two very important functions—viz., it will prevent the pan from yielding to the pressure of the broom in sweeping the dust onto it, and it will also tend, because of the attachment of the front end of the strip to the bottom of the pan near its front edge and at a point above the floor, to press the front or receiving edge of the pan into close proximity to the carpet or floor, thereby preventing the dust from escaping beneath the edge.

The pan as thus constructed may be used without necessitating the holding of the broom in one hand, and it is eminently convenient for use by persons who are deprived of the use of one of their arms.

Having thus fully described my invention, what I claim as new, and desire to secure by Letters Patent, is—

1. The combination, with the pan provided with a ledge to retain the dust, of a base-strip hinged to the bottom of the pan, and a standard hinged to the bottom of the pan to the rear of the hinge-connection between the base-strip and bottom, the said standard having a movable bearing on the base-strip, substantially as set forth.

2. The combination, with the pan and a base-strip hinged to the bottom of the pan near its front edge, of a standard hinged at one end to the rear edge of the pan, and its other end having a movable bearing on the base-strip, substantially as set forth.

3. The combination, with the pan and a base-strip hinged to the pan near its front edge, of a slide seated on the base-strip, and a link or standard hinged to the pan and to the slide, substantially as set forth.

4. The combination, with the pan and the grooved base-strip hinged to the pan near its front edge, of a slide seated in the groove in the base strip, a standard hinged to the slide and to the pan, and a handle extending rearwardly from the back of the pan, substantially as set forth.

In testimony whereof I affix my signature in presence of two witnesses.

EMMA S. COLT.

Witnesses:
S. K. FARR,
BESSIE E. YOUNG.